2,967,186
Patented Jan. 3, 1961

2,967,186
SUBSTITUTED BENZOPHENONES

David A. Gordon and Billy E. Burgert, Midland, Mich., assignors to The Dow Chemical Company, Midland, Mich., a corporation of Delaware No Drawing. Filed Nov. 5, 1958, Ser. No. 771,971

4 Claims. (Cl. 260—348)

The present invention relates to benzophenones, and is particularly directed to the novel 4- or 4'-(2,3-epoxypropoxy)-2-hydroxybenzophenone corresponding to the formula

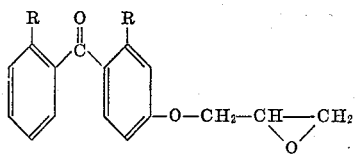

In this and succeeding formulas in the present specification and claims, one R represents hydrogen and the other R represents a hydroxyl group. The novel compounds are crystalline solids of a light yellow to very light yellow color, soluble in many common organic solvents including toluene, acetone, and lower alkanols, and of very low solubility in water. These compounds are useful as fungicides and insecticides for the protection of terrestrial plants, as nematocides, and as herbicides in the control of submerged and floating aquatic vegetation.

The compounds of the present invention may be prepared by reacting the sodium salt of the dihydroxybenzophenone with epichlorohydrin. When it is desired to produce the 4-(2,3-epoxypropoxy)-2-hydroxybenzophenone, the 2,4-dihydroxybenzophenone reactant is employed. When it is desired to produce the 4'-(2,3-epoxypropoxy)-2-hydroxybenzophenone, the 2,4'-dihydroxybenzophenone reactant is employed. Conveniently, the employed sodium derivative of the dihydroxyphenone may be prepared in situ by dispersing the corresponding dihydroxybenzophenone in dilute aqueous alkali. Epichlorohydrin reactant may, conveniently, be added to such dispersion with stirring, at a temperature of from 40° to 120° C., with preparation of the desired product and sodium chloride of reaction. Good results are obtained when employing the dihydroxybenzophenone, alkali metal hydroxide in aqueous solution, and epichlorohydrin in equimolecular amounts; but it is preferred to employ a moderate excess amount of epichlorohydrin over the amount equimolecular with other reactants. Such excess aids in obtaining better yields, and may be recovered with little or no loss upon completion of the reaction.

In carrying out the reaction, the dihydroxybenzophenone, dispersed in warm aqueous alkali metal hydroxide solution, is added dropwise, slowly, with stirring, and over a period of time to the epichlorohydrin reactant at a temperature in the reaction temperature range, preferably between 90° and 95° C. Upon completion of the combination of the reactants, stirring and heating of the resulting reaction mixture in the reaction temperature range are continued for an additional period of time to force the reaction to completion. Upon completion of the reaction, the desired product may be separated from the reaction mixture. In one manner of separation, the desired product is extracted from the reaction mixture, by the use of an organic solvent which is immiscible with, and, containing the desired products, separates from, the aqueous reaction mixture. The organic product layer is then separated, as by decantation or in a separatory funnel, washed with water, dried, and fractionally distilled at gradually increasing temperatures and under gradually decreasing, subatmospheric pressures to obtain the desired product. Alternatively, the desired product may be separated and purified by successive fractional crystallization from solvent. Both the steps of recrystallization and distillation may be employed, if desired.

The following examples illustrate the present invention, but are not to be considered as limiting it.

*Example 1.—4 - (2,3 - epoxypropoxy) - 2-hydroxybenzophenone*

A solution of 2,4-dihydroxybenzophenone (107 grams; 0.5 mole) in a 250 milliliter aqueous solution containing 20 grams (0.5 mole) sodium hydroxide was added slowly, dropwise, with stirring and heating, over a period of 110 minutes, to 138 grams (1.5 moles) epichlorohydrin at 91°–95° C. The resulting reaction mixture was heated at 95° C., with continued stirring, for an additional period of 30 minutes, to carry the reaction to completion. At the end of the reaction period, 400 milliliters of methylisobutylketone solvent was added to the reaction mixture and shaken, and the resulting biphasic mixture divided into aqueous by-product layer which was discarded, and organic product layer which was washed with water and dried, and thereafter fractionally distilled at gradually increasing temperatures and gradually decreasing subatmospheric pressures. From such distillation was obtained a 4-(2,3-epoxypropoxy)-2-hydroxybenzophenone product boiling in the temperature range of 181° to 206° C., under pressures of 0.12 to 0.14 milliliter absolute. Upon cooling, this product was a very pale yellow crystalline solid melting at 99°–100° C.

*Example 2.—4' - (2,3 - epoxypropoxy) - 2-hydroxybenzophenone*

In this example, 2,4'-dihydroxybenzophenone, dispersed in aqueous sodium hydroxide, was added dropwise and with stirring to epichlorohydrin, in quantities, at temperatures, and for periods of time identically the same as those described in Example 1. The resulting reaction mixture was extracted with methyl isobutyl ketone, and the organic product solution separated, water washed, and dried as described in Example 1. Thereafter, the resulting washed organic mixture was fractionally distilled at gradually rising temperatures and decreasing subatmospheric pressures. As a result of these operations, there was obtained a 4'-(2,3-epoxypropoxy)-2-hydroxybenzophenone product which distilled in the temperature range of 182° to 200° C. under a pressure of 0.18 to 0.20 millimeter absolute. Upon cooling, this product was a light yellow crystalline solid melting at 66°–67° C.

The present compounds are useful as parasiticides in the control of fungi, insects, and nematodes affecting terrestrial plants, and as herbicides in the control of submerged or floating aquatic vegetation. For such uses, the compound may be dispersed on an inert, finely divided solid and the resulting preparation employed as a dust. Also, such preparations may be dispersed in water with or without the aid of a wetting agent and the resulting aqueous suspensions employed as sprays. In other procedures, the compound may be employed in a solvent such as oil or as a constituent of solvent-in-water or water-in-solvent emulsions or as aqueous dispersions thereof which may be applied by spray, drench or wash. In a representative operation, the exposure for a period of 1 hour of a population of healthy, strongly growing plants of Anacharis spp. to water in which was dispersed 4-(2,3-epoxypropoxy)-2-hydroxybenzophenone in the concentration of 400 parts by weight per million parts of ultimate aqueous dispersion, resulted in a 100 percent kill of the said Anacharis. Similar applications at the same rate resulted also in 100 percent kill of the aquatic plants *Cabomba caroliniana*, *Lysimastrum nummularia*, and *Salvinia rotundifolia*. Similarly, the exposure for a period of two hours of a population of the plant *Cabomba caroliniana* to water containing 100 parts by weight of 4'-(2,3-epoxypropoxy)-2-hydroxybenzophenone per million parts of ultimate aqueous dispersion resulted in a complete kill of all parts of the plants comprising a large proportion of the population of the said species.

In contrast, the application as a thorough wetting spray of an aqueous dispersion containing 3.3 pounds per 100 gallons of ultimate composition of 4-(2,3-epoxypropoxy)-2-hydroxybenzophenone to young plants of tomato, cranberry bean, field corn, wild oats, and rape, produced no visible injury or other effect upon any of the said terrestrial plants.

Various modifications of the process and products of the present invention may be made without departing from the spirit or scope thereof, and it is to be understood that we limit ourselves only as defined in the appended claims.

We claim:
1. A compound corresponding to the formula

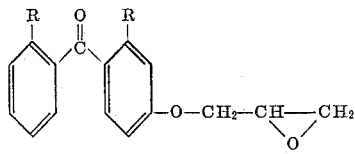

wherein one R is hydrogen and the other R is a hydroxyl group.
2. 4-(2,3-epoxypropoxy)-2-hydroxybenzophenone.
3. 4'-(2,3-epoxybenzopropoxy)-2-hydroxybenzophenone.
4. A method of preparing a compound corresponding to the formula

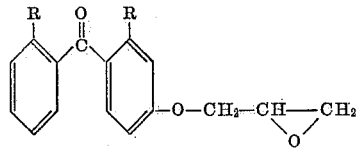

wherein one R is hydrogen and the other R is a hydroxyl group which consists of contacting epichlorohydrin and the sodium salt of a member selected from the group consisting of 2,4-dihydroxybenzophenone and 2,4'-dihydroxybenzophenone at a temperature in the range of from 40° to 120° C.

References Cited in the file of this patent

UNITED STATES PATENTS

| | | |
|---|---|---|
| 2,371,500 | Britton et al. | Mar. 13, 1945 |
| 2,528,417 | Bradley | Oct. 31, 1950 |
| 2,668,807 | Greenlee | Feb. 9, 1954 |

OTHER REFERENCES

Nadkarni et al.: J. Chem. Soc. (London), pp. 589–591 (1936).

UNITED STATES PATENT OFFICE
CERTIFICATE OF CORRECTION

Patent No. 2,967,186                 January 3, 1961

David A. Gordon et al.

It is hereby certified that error appears in the above numbered patent requiring correction and that the said Letters Patent should read as corrected below.

Column 4, line 4, for "epoxybenzopropoxy" read -- epoxypropoxy --.

Signed and sealed this 12th day of September 1961.

(SEAL)
Attest:

ERNEST W. SWIDER               DAVID L. LADD
Attesting Officer               Commissioner of Patents
                                                  USCOMM-DC